(12) United States Patent
Huo et al.

(10) Patent No.: US 8,184,874 B2
(45) Date of Patent: May 22, 2012

(54) ENHANCED DISPLAY OF MEDICAL IMAGES

(75) Inventors: Zhimin Huo, Pittsford, NY (US); David H. Foos, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 1032 days.

(21) Appl. No.: 11/615,181

(22) Filed: Dec. 22, 2006

(65) Prior Publication Data

US 2008/0152204 A1 Jun. 26, 2008

(51) Int. Cl.
*G06K 9/00* (2006.01)
*G06K 9/34* (2006.01)

(52) U.S. Cl. ........................................ 382/128; 382/173

(58) Field of Classification Search .......... 382/128–134, 382/254–275, 298
See application file for complete search history.

(56) References Cited

U.S. PATENT DOCUMENTS

| | | | |
|---|---|---|---|
| 5,038,383 A * | 8/1991 | Usumoto et al. .............. | 382/235 |
| 5,343,390 A * | 8/1994 | Doi et al. ...................... | 382/132 |
| 6,778,691 B1 | 8/2004 | Barski et al. | |
| 6,933,983 B2 * | 8/2005 | Wredenhagen et al. ...... | 348/618 |
| 2002/0154802 A1 | 10/2002 | Goldkuhl et al. | |
| 2002/0181797 A1 | 12/2002 | Young | |
| 2003/0091222 A1 | 5/2003 | Young et al. | |
| 2005/0135695 A1 | 6/2005 | Bernard et al. | |
| 2005/0240882 A1 * | 10/2005 | Morita et al. ................. | 715/964 |

FOREIGN PATENT DOCUMENTS

| | | |
|---|---|---|
| EP | 1 211 643 A2 | 6/2002 |
| EP | 1 398 722 A | 3/2004 |
| WO | 02/42998 | 5/2002 |
| WO | 02/056240 | 7/2002 |
| WO | 2006/056798 A | 6/2006 |

OTHER PUBLICATIONS

Morrow et al., Region-Based Contrast Enhancement of Mammograms, IEEE Transactions on Medical Imaging, No. 3, vol. 11, Sep. 1, 1992, pp. 392-406, ISSN: 0278-0062.
J. Michael Fitzpatrick, Milan Sonka, *Handbook of Medical Imaging, Volume 2. Medical Image Processing and Analysis*, (SPIE Press Book), Jun. 14, 2000, Chapter 15, "Computer-Aided Diagnosis in Mammography," by Maryellen L. Giger, et al., pp. 915-1004.
International Search Report dated Apr. 6, 2009 for International Application No. PCT/US2007/024808, 3 pages.

* cited by examiner

*Primary Examiner* — Alex Liew

(57) ABSTRACT

A method of processing a digital radiographic medical image. The digital radiographic medical image is accessed and a plurality of regions of interest is determined. For each of the plurality of regions of interest, steps are performed: determining at least one candidate region of interest (ROI) disease; identifying one ROI disease from the at least one candidate region of interest; determining a processing method appropriate to the identified one ROI disease; and applying the determined processing method to the region of interest to generate a disease enhanced region of interest. The digital radiographic medical image and one or more of the disease enhanced regions of interest can then be displayed.

9 Claims, 5 Drawing Sheets

ENHANCED DISPLAY OF MEDICAL IMAGES

FIELD OF THE INVENTION

This invention relates in general to image display of digital radiograph, in particular, to a method of image processing which optimizes a display of the regions-of-interest of a radiographic medical image.

BACKGROUND OF THE INVENTION

Breast cancer is one of the leading causes of death in women in developed countries. The most effective way to improve prognosis and survival rate is early detection and treatment of breast cancer. Currently, mammography is the most effective method for early diagnosis of breast cancers. Studies have shown that radiologists fail to detect cancer that was evident retrospectively on radiographs. The missed detections may be due to the subtle nature of the radiographic findings, poor image quality, eye fatigue or simply oversight by radiologists. It is has been suggested that the reading of mammograms by two radiologists increases cancer detection rate by 15%. As an alternative method to double reading, computerized methods have been investigated as an aid to radiologists in improving their diagnostic accuracy. Computer-aided diagnosis (CAD) is defined as a diagnosis made by a radiologist who uses the output of a computer analysis of an image.

Various systems and methods are currently known as CAD systems for computerized detection of abnormalities on radiological images, such as those disclosed by Giger et al. in "Handbook of Medical Imaging" published by SPIE Press. It has been shown that use of CAD systems improves radiologists' sensitivity in detecting cancer with a slight increase in recall rate caused by the false-positive markers generated by the computer. Currently, the suspicious locations identified by computerized detection algorithm are typically annotated by arrows, circles or other symbols and numerical numbers on a display medium to direct radiologists' attention to these detected regions-of-interest (ROIs), such as those disclosed by patents WO 0242998 and WO 02002056240.

For exams using screen/film systems, a radiologist typically uses a light box to analyze images. For images acquired digitally, for example, computed radiography and digital radiography systems for breast and chest imaging, image interpretation using a workstation equipped with a high-resolution display has become a trend. The advantages of digital capture and display over screen/film system include the wide dynamic range and the ability to manually adjust the image to have the look based on an individual preference for a better diagnosis.

One of the limitations that prevent CAD from being widely used in clinical practice is the low tolerance for the number of false-positive markers per image generated by a CAD algorithm. Radiologists may feel compelled to reexamine the computer-detected regions to make follow-up recommendation necessary. Manual manipulation of images to obtain an optimal display of each computer-identified ROI may be performed by individual radiologists. In clinical environment where high volume x-ray screening procedures are performed routinely and the majority of the exams are negative, a large number of false-positive detections could be a major factor that slows down the reading process.

Additional information such as the computer-estimated probability from the above methods could potentially help radiologists in their decision making process. For example, radiologists may spend less time on computer-detected regions with a low probability of being cancer. However, radiologists may still likely to exam some CAD detections of low probabilities with manually manipulation of the images to optimize the look for a better diagnosis of these CAD detected abnormalities U.S. patent application No. 2005/0240882 (Morita et al.) is directed to a method for displaying a number of computer-detected regions of pathological interest of an anatomic feature, comprising steps of displaying an image of the anatomical feature, simultaneously displaying with the image a uniquely identified marker corresponding to each computer-detected region of pathological interest; wherein each marker is generated from the image by a computer-implemented detection algorithm and is configured to incorporate viewable classification data entered by a user. Each marker is configured to visually indicate the probability of cancer determined by the computer-implemented detection algorithm, where in the color of each marker visually indicate the probability of cancer determined by computer-implemented algorithm.

WO Application No. 02/42998 (Roehrig et al.) is directed to a method providing annotation information that can include an assessment of the probability, likelihood or predictive of the CAD-detected suspicious abnormalities as an additional aid to radiologists.

U.S. patent application No. 2002/0181797 (Yang et al.) is directed to a method improving disease diagnosis using contrast enhancement weighted for different frequency contents in mammography.

U.S. patent application No. 2002/0154802 (Goldkuhl et al.) is directed to a method for mammography contrast enhancement using multiple exposure technique.

U.S. patent application No. 2003/0091222 (Yang et al.) is directed a method improving global contract enhancement for digital portal images.

U.S. Pat. No. 6,778,691 (Barski et al.) is directed to a method improving global contrast for general chest radiography.

U.S. Ser. No. 11/549,130 (Huo et al), titled METHOD FOR ENHANCED VISUALIZATION OF MEDICAL IMAGES, commonly assigned, is directed to a method improving the visibility of microcalcifications while improving the overall contrast of digital mammograms.

U.S. patent application No. 2005/0135695 (Bernard et al) is directed to locating ROIs containing microcalcifications and enhancing the ROIs.

Applicants believe that the efficiency and effectiveness of image interpretation could be increased using a computer system by automatically detecting and then automatically enhancing the visualization of potential abnormalities in the identified ROIs. The improved display of a radiographic image with the enhanced visualization of these computer-detected ROIs may reduce the amount of time or even eliminate that time required for manual manipulation. The display with the enhanced ROIs can allow radiologists to assess these enhanced regions of interest in the context of overall image, which is less disruptive than the current method.

Particularly in mammography, various techniques and methods have been developed to enhance the contrast (both global and local) to help radiologists to better visualize the subtle difference in density between abnormalities and normal tissue. However, these methods are for general optimization purpose, not for a disease specific optimization purpose.

The present invention is directed to a method consisting of detecting ROIs containing a disease, using information such as computer-extracted features, disease type, patient information to select an optimal image processing to enhance individual ROIs for contrast enhancement and/or noise removal, enhancing individual ROIs with selected optimal processing methods corresponding to each ROI or enhancing the entire image with the selected optimal method.

The present invention will locally optimize ROIs or globally optimize the entire images based on computer-detected results. Further, ROIs are enhanced differently to highlight specific features interested based on computer extracted information and individual users' preferences. The customized enhancement will reduce or eliminate the amount of time spent on manual manipulation, thus improve the overall workflow with computer-aided detection.

SUMMARY OF THE INVENTION

Accordingly, an objective of this invention is to provide a method, system and computer readable medium that employs a display workstation for computer-assisted interpretation of medical images.

Another objective of the invention is to provide a method to select specific image processing technique optimal to images based on information extracted from computer and other information. The information may include disease type, estimated likelihood, computer-extracted morphological features, contrast, and noise property, patient information such as previous history of biopsies and cancer, family history and use input information.

Another objective of the invention is to provide a method to select an image processing optimal for individual ROIs detected by computer or by a user for local enhancement.

Another objective of the invention is to provide an imaging display method to display mammographic images with locally-enhanced ROIs highlighted with or without markers such as a rectangular box, circle, or an arrow.

In one embodiment of the invention, the display device provides an option for toggling on or off the highlighted markers.

In another embodiment of the invention, the display device provides an option to turn ON or OFF the locally enhanced ROIs.

In another embodiment of the invention, the display device provides a method to automatically display the enhanced ROIs all at the once.

In another embodiment of the invention, the display device provides a method to automatically display locally enhanced ROIs sequentially in the order determined by the computer. The order can be determined based on computer-estimated likelihood of malignancy.

In another embodiment of the invention, the display device provides options to allow radiologists to manually select a disease type.

In another embodiment of the invention, the display device provides an option to allow users to interactively adjust the local contrast and brightness for individual ROIs.

The method and system of the enhanced display system combines the benefit of computer-aided diagnosis with the enhanced visualization techniques. It is believed that the enhanced display of these highlighted regions of interest aid radiologists to review the computer detection efficiently and effectively, and to improve diagnostic accuracy.

According to one aspect of the present invention there is provided a method of processing a digital radiographic medical image. The digital radiographic medical image is accessed and a plurality of regions of interest is determined. For each of the plurality of regions of interest, steps are performed: (a) determining at least one candidate region of interest (ROI) disease; (b) identifying one ROI disease from the at least one candidate region of interest; (c) determining a processing method appropriate to the identified one ROI disease; and (d) applying the determined processing method to the region of interest to generate a disease enhanced region of interest. The digital radiographic medical image and one or more of the disease enhanced regions of interest can then be displayed.

According to another aspect of the present invention, there is provided a method of processing a digital radiographic medical image. The digital radiographic medical image is accessed and a plurality of regions of interest is determined. Each of the plurality of regions of interest is analyzed to determine a set of candidate region of interest diseases. The set of candidate region of interest diseases is analyzed to determine one image disease for the digital radiographic medical image. An image processing method is determined appropriate to the identified one image disease. The image processing method is applied to the digital radiographic medical image to generate a disease enhanced medical image; and the disease enhanced medical image is displayed.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 3 shows a posterior-anterior chest image with locally enhanced ROIs containing computer-detected lung nodules.

DETAILED DESCRIPTION OF THE INVENTION

Figure 1:
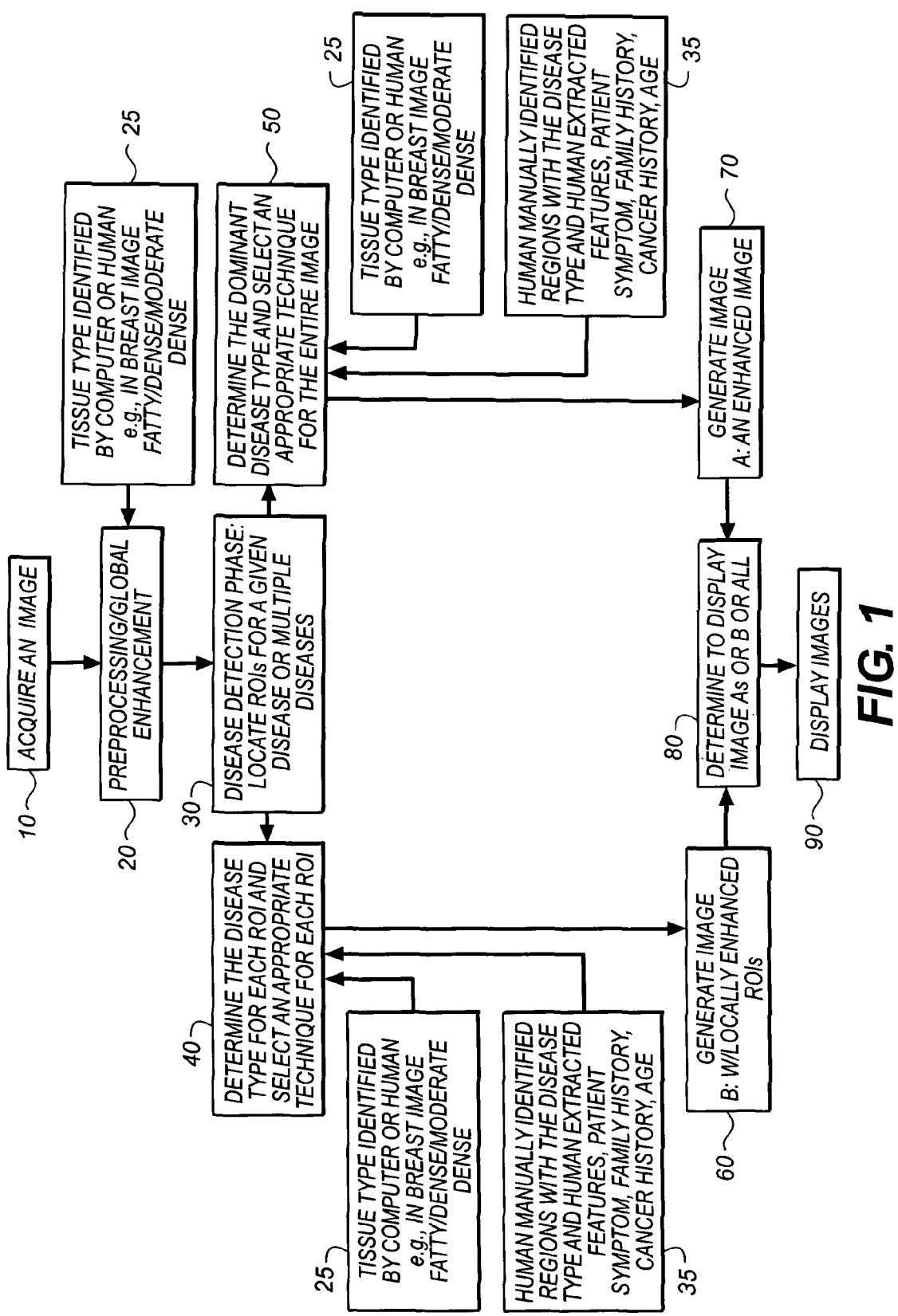
FIG. 1 is a flow diagram illustrating a method in accordance with the present invention.

The following is a detailed description of the preferred embodiments of the invention, reference being made to the drawings in which the same reference numerals identify the same elements of structure in each of the several figures.

FIG. 1 provides a flow diagram of a method in accordance with the present invention. The method of the present invention can employ a display workstation for computer-assisted interpretation of medical images.

As shown in FIG. 1, a digital radiographic image is acquired (step 10).

An optional preprocessing of the radiographic image can be performed (step 20) for global contrast enhancement. Means of performing global contrast enhancement are known to those skilled in the art. This preprocessing may be desired before a disease detection phase, as described below.

It is noted that further information, for example, exam-type and/or tissue-type (step 25) identified by a computer or a user, can be incorporated into the image preprocessing (step 20). For example, for mammography, a breast can be categorized as extremely dense, heterogeneously dense, with scattered fibroglandular densities and almost entirely fatty. A tissue-type or an exam-type specific image process can be applied to the entire image to enhance overall contrast for a better visualization.

At step 30, a disease detection phase is performed. More particularly, a computer analysis is performed to detect suspected regions for a candidate/targeted disease or multiple candidate/targeted diseases. Multiple computer algorithms can be applied sequentially or simultaneously to detect different diseases presented in the radiographic image. For example, in breast imaging, two separate computer algorithms can be applied, one for the detection of mass lesions and one for the detection of microcalcifications. In a further example, in chest imaging, multiple disease-specific algorithms can be applied to detect lung nodules, pneumothorax, emphysema, interstitial disease, and the like.

It is noted that computer detection algorithms used for the disease detection phase (step 30) can be optimized for a particular tissue type, for example, for each breast tissue type.

At step 40, a disease type is determined for each region of interest (ROI), and an appropriate image processing technique is selected for each ROI (step 40). More particularly, for each region (e.g., a single pixel or groups of pixels) located in step 30, an enlarged region of interest (ROI) centered about the computer-detected region is identified. The selection of an image processing technique for each ROI can depend on the disease type detected by the computer or user. Information (such as disease type, likelihood of being a disease type, likelihood of being cancer, morphological features including size, shape, margin, speculation, density and texture) can be used to tune the process. The information can be merged/combined with other information such as patient's symptom, age, family history, previous cancer and biopsy history, and or human-extracted features to determine the type of image processing techniques used to enhance individual ROIs (steps 25 and 35). For example, the techniques used for masses can be different from those used for calcifications in mammograms. Low-contrast masses in mammograms can be processed differently from high contrast masses in mammograms. Highly suspicious malignant candidates can be enhanced more than those with low suspicion. The imaging processing techniques can be contrast enhancement, edge-enhancement, or noise suppression to increase the conspicuity of the disease in question. Multiple versions of locally-enhanced ROIs can be generated depending on users' preferences. For example, one version can be an image with locally enhanced ROIs for masses detected and another with locally enhanced ROIs for microcalcifications detected.

At step 50, a dominant disease type is determined for the entire image, and an appropriate image processing technique is selected for the entire image (step 50). That is, based on the analysis of the known information, the computers or the user can select one image processing technique to enhance the entire image. For example, if microcalcification is the dominant disease type determined by the computer or user, a enhancement technique for microcalcification will be selected. Refer, for example, to METHOD FOR ENHANCED VISUALIZATION OF MEDICAL IMAGES, by Huo et al, U.S. Ser. No. 11/549,130, filed on Oct. 13, 2006, incorporated herein by reference, which describes a method for enhancing the image contrast of a digital image.

It is noted that the computer or the user can select more than one dominant disease types or features for enhancement. For example in chest images, the computer or the user can select to process the entire image for the enhancement of lung nodules and pneumothorax separately if these two diseases are identified as the two dominant diseases. Thus two enhanced images could be generated for display separately.

As with step 20, further information, for example, exam-type and/or tissue-type (step 25) identified by a computer or a user, can be incorporated into the determination and selection at step 40 and/or step 50.

In addition, at steps 40 and 50, information can be merged/combined with other information such as patient's symptom, age, family history, previous cancer and biopsy history, and or human-extracted features to determine the type of image processing techniques used to enhance the entire image (step 35).

Once the disease type is determined and appropriate image processing technique is selected for each ROI (step 40), locally enhanced ROIs are generated by applying the selected appropriate image processing technique (step 60).

Similarly, once the disease type is determined and appropriate image processing technique is selected for the entire image (step 50), an enhanced image is generated (step 70) by applying the selected appropriate image processing technique.

A determination is made at step 80 regarding the images to be displayed. For example, only the locally enhanced ROIs (from step 60) could be displayed. Alternately, the locally enhanced ROIs (from step 60) could be displayed in overlay on the enhanced image (generated at step 70). Still further, the locally enhanced ROIs (from step 60) could be displayed in overlay on the original image. Yet still, only the enhanced image (generate at step 70) could be displayed. The enhanced ROIs (step 60) and enhanced image (step 70) can be merged/combined to generate an enhanced image having enhanced ROIs. The images from steps 60 and 70 can be individually displayed or simultaneously displayed.

The output images from the system can be multiple images including enhanced images optimized for the entire image based on the dominant types or features and/or an image with locally enhanced ROIs detected.

At step 90, the selected image(s) is displayed.

Figure 2:
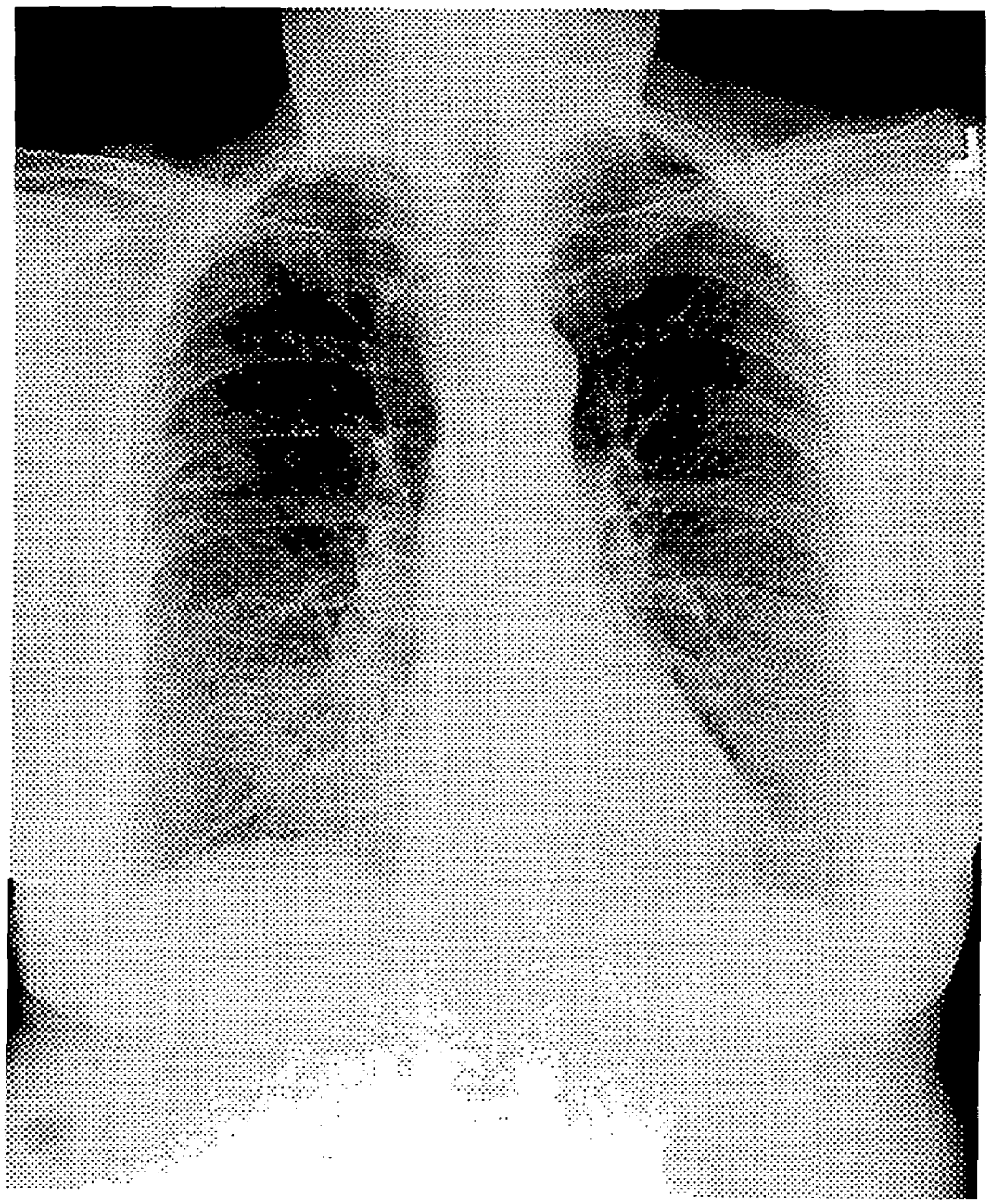
FIG. 2 shows a disease enhanced image according to the present invention.
Figure 3:
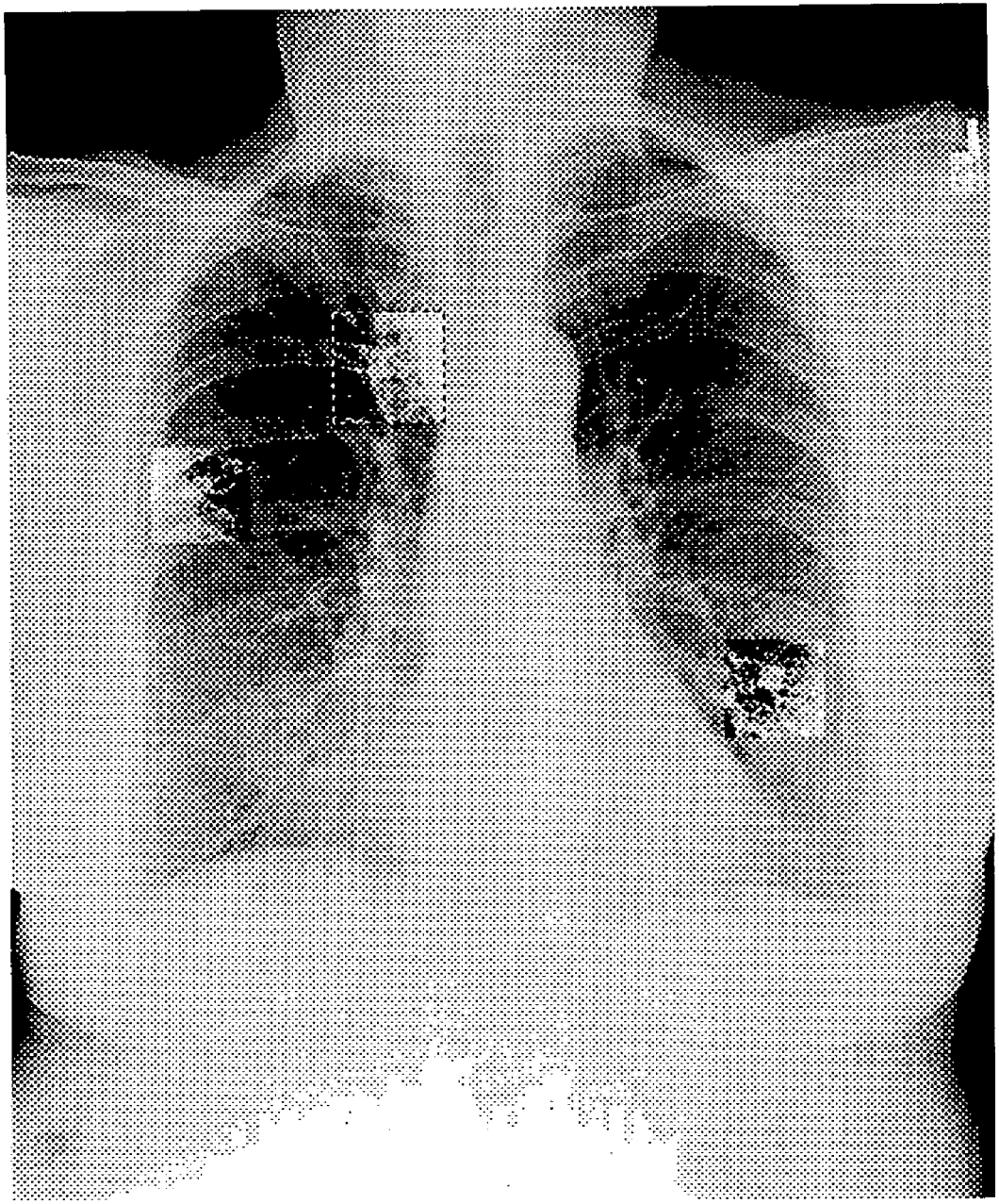
FIG. 3 shows an image having locally enhanced regions of interest in accordance with the present invention. Specifically.

FIGS. 2 and 3 are provided to illustrate the method according to the present invention. In particular, FIG. 2 shows a disease enhanced medical image according to the present invention, and FIG. 3 shows an image displaying locally-adapted contrast enhanced ROIs detected by a computer detection algorithm for lung nodules. As shown in FIG. 3, the locally enhanced ROIs are shown in a square/rectangular box, though other arrangements can be employed such as an oval, circle, or arrow.

Figure 4:
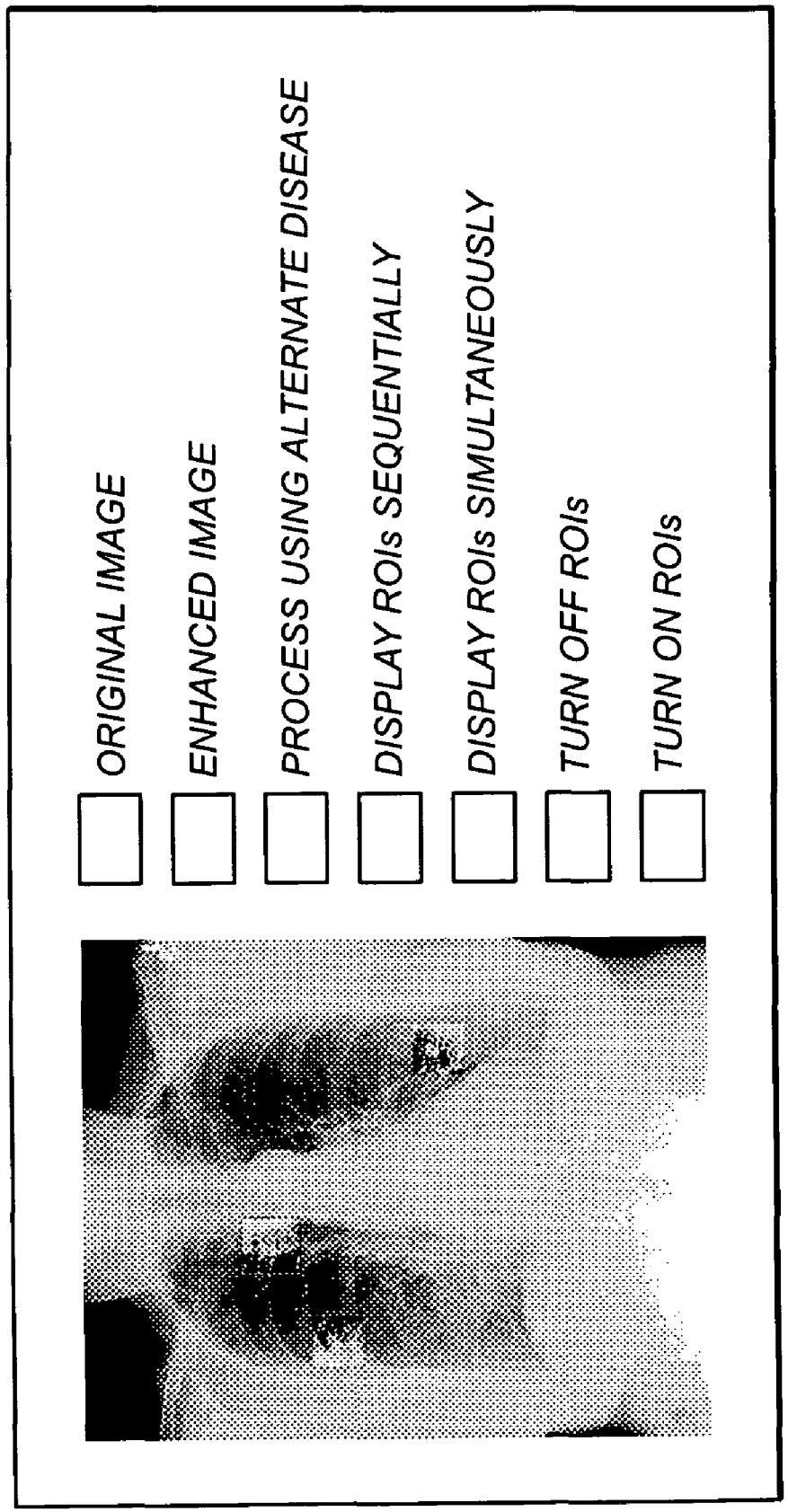
FIG. 4 shows an exemplary display device showing features of the present invention for displaying images.
Figure 5:
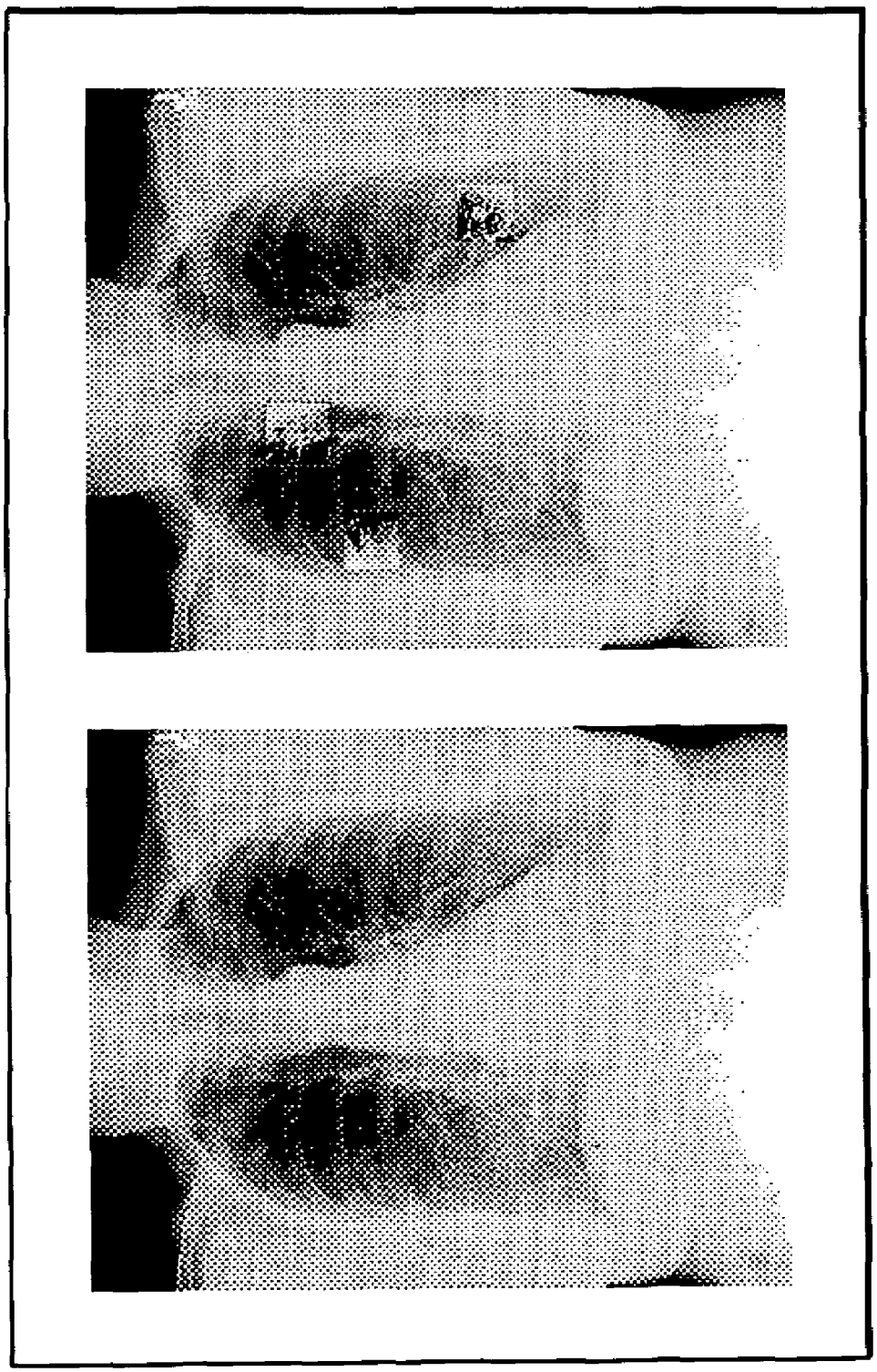
FIG. 5 shows an exemplary display device simultaneously showing the disease enhanced image and the disease enhanced regions of interest.

Referring to FIGS. 4 and 5, the display device can provide an option for a user to select/flip through the enhanced images. For images with locally enhanced ROIs (such as FIG. 3), a user can turn ON or OFF highlighted markers such as a rectangular box around the ROI, circle, or an arrow.

The display device can provide an option to turn ON or OFF the locally enhanced ROIs on the input image or a globally enhanced version of the input image.

Further, the display device can provide means to automatically display all the locally enhanced ROIs simultaneously (such as with a single button selection) or display the locally enhanced ROIs sequentially in a particular order determined by the computer or selected by the user. For example, the order can be determined based on computer-estimated likelihood of malignancy.

In addition, the display device can provide an option to allow a user (e.g., a radiologist) to manually select an ROI for enhancement, select a disease type or features for a preferred image processing and/or interactively adjust the local contrast and brightness for individual ROIs.

Locally adapted and disease-specific image display enhancements provide some advantages over conventional global image display enhancement. For example, global enhancement is typically performed on raw image data to generate an optimized global look for display, while certain detailed features of interest in a region of interest can be suppressed. With the guide of computer detection, automated optimization for a given disease type in the regions of interest can be accomplished without the loss of detailed information that is of interest because the original raw image data can be used for the location optimization, while the background can be maintained to have the same appearance that is optimized globally for display.

In the above description, the present invention is described as a software program. Those skilled in the art will recognize that the equivalent of such software may also be constructed in hardware.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method carried out by a computer of processing a digital radiographic medical image, comprising:
   accessing the digital radiographic medical image;
   determining a plurality of enlarged regions of interest;
   for each of at least one and another of the plurality of regions of interest:
   (a) determining at least one candidate region of interest (ROI) disease;
   (b) identifying one ROI disease from the at least one candidate region of interest;
   (c) determining a processing method appropriate to the identified one ROI disease; and
   (d) applying the determined processing method appropriate to the region of interest to generate a disease enhanced region of interest;
   wherein the disease identified in said one of said plurality of regions of interest is different from the disease identified in said another of said plurality of regions of interest and wherein the processing method is different for each of said identified diseases; and
   displaying the digital radiographic medical image and the at least one and another of the disease enhanced regions of interest.

2. The method of claim 1, further comprising preprocessing the radiographic image for global contrast enhancement prior to determining the plurality of regions of interest.

3. The method of claim 1, further comprising:
   analyzing the plurality of regions of interest to determine one image disease for the digital radiographic medical image;
   determining an image processing method appropriate to the identified one determined image disease;
   applying the image processing method to the digital radiographic medical image to generate a disease enhanced medical image; and
   displaying the disease enhanced medical image and the at least one and another of the disease enhanced regions of interest.

4. The method of claim 1, wherein the at least one and another of the disease enhanced regions of interest are displayed sequentially.

5. The method of claim 1, wherein the at least one and another of the disease enhanced regions of interest are displayed simultaneously.

6. A method carried out by a computer of processing a digital radiographic medical image, comprising:
   accessing the digital radiographic medical image;
   determining a plurality of enlarged regions of interest;
   for each of at least one and another of the plurality of regions of interest:
   (a) determining at least one candidate region of interest (ROI) disease;
   (b) identifying one ROI disease from the at least one candidate region of interest;
   (c) determining a processing method appropriate to the identified one ROI disease; and
   (d) applying the determined processing method appropriate to the region of interest to generate a disease enhanced region of interest;
   wherein the disease identified in said one of said plurality of regions of interest is different from the disease identified in said another of said plurality of regions of interest and wherein the processing method is different for each of said identified diseases;
   analyzing the plurality of regions of interest to determine one image disease for the digital radiographic medical image;
   determining an image processing method appropriate to the identified one determined image disease;
   applying the image processing method to the digital radiographic medical image to generate a disease enhanced medical image; and
   displaying the disease enhanced medical image and the at least one and another of the disease enhanced regions of interest.

7. A method carried out by a computer of processing a digital radiographic medical image, comprising:
   accessing the digital radiographic medical image;
   determining a plurality of enlarged regions of interest;
   analyzing each of the plurality of regions of interest to determine a plurality of candidate region of interest diseases;
   analyzing the plurality of candidate region of interest diseases to determine one image disease for the digital radiographic medical image;
   determining an image processing method appropriate to the identified one image disease;
   applying the image processing method to the digital radiographic medical image to generate a disease enhanced medical image;
   displaying the disease enhanced medical image; and
   further comprising, for each of at least one and another of the plurality of regions of interest:
   determining at least one candidate region of interest (ROI) disease;
   identifying one ROI disease from the at least one candidate region of interest;
   determining a ROI processing method appropriate to the identified one ROI disease;

applying the ROI processing method appropriate to the region of interest to generate a disease enhanced region of interest;

wherein the disease identified in said one of said plurality of regions of interest is different from the disease identified in said another of said plurality of regions of interest and wherein the processing method is different for each of said identified diseases; and displaying the at least one and another of the disease enhanced regions of interest.

8. The method of claim 7, wherein the disease enhanced medical image and the at least one and another of the disease enhanced regions of interest are displayed simultaneously.

9. The method of claim 7, wherein the disease enhanced medical image and the at least one and another of the disease enhanced regions of interest are displayed separately.

* * * * *